No. 657,112. Patented Sept. 4, 1900.
G. HAYES.
RESILIENCY DEVICE FOR WHEELS.
(Application filed Jan. 17, 1900.)
(No Model.) 3 Sheets—Sheet 1.
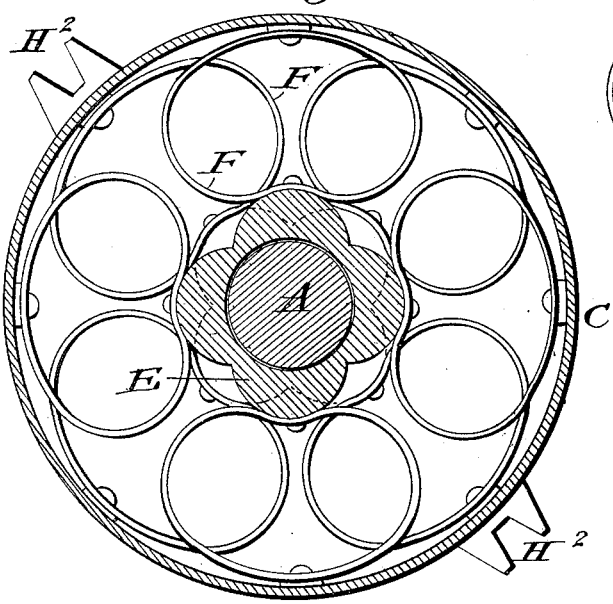
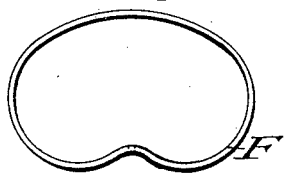
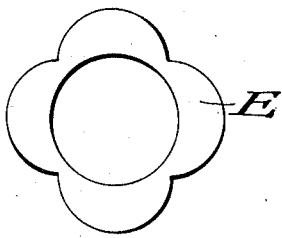
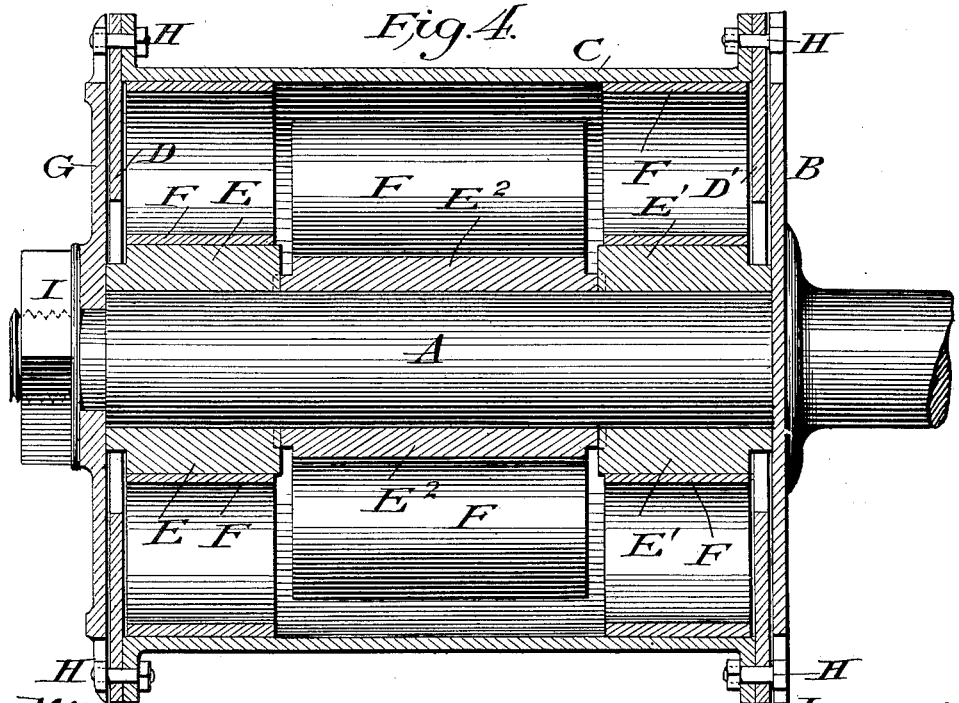

No. 657,112. Patented Sept. 4, 1900.
G. HAYES.
RESILIENCY DEVICE FOR WHEELS.
(Application filed Jan. 17, 1900.)
(No Model.) 3 Sheets—Sheet 2.
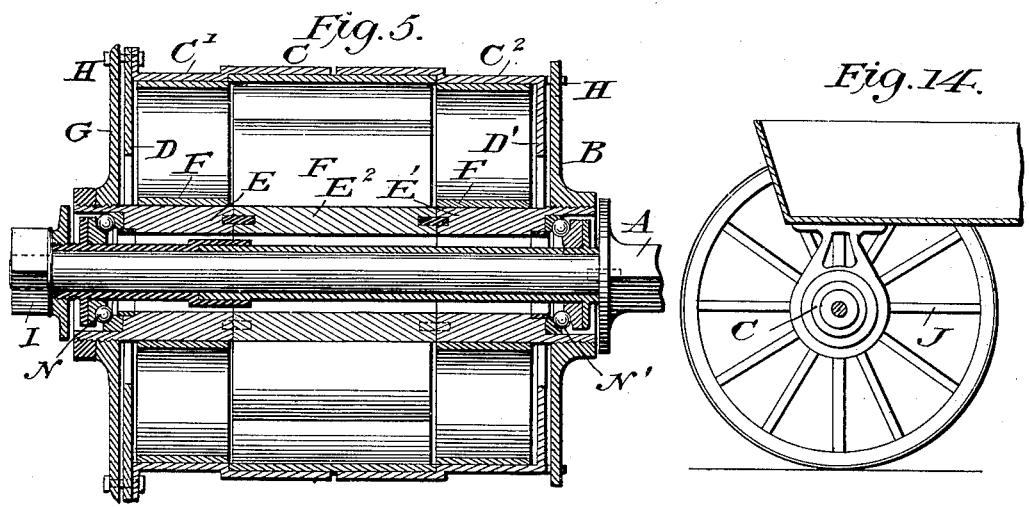
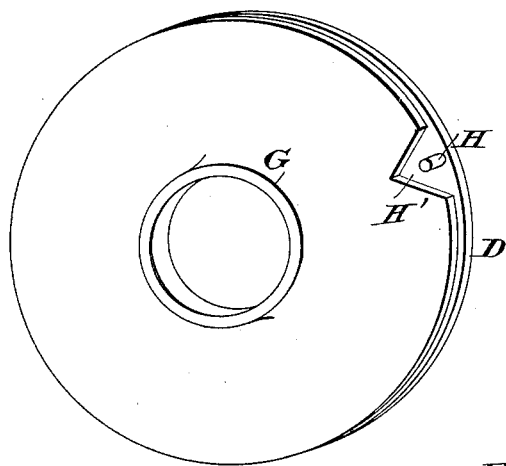
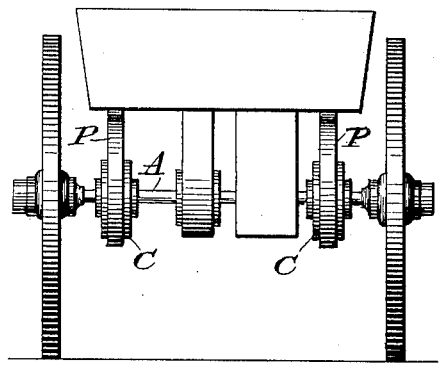
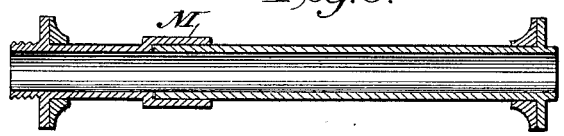
Witnesses:
Arthur Hayes.
Geo. A. Hayes.
Inventor:
Geo. Hayes.

No. 657,112. Patented Sept. 4, 1900.
G. HAYES.
RESILIENCY DEVICE FOR WHEELS.
(Application filed Jan. 17, 1900.)
(No Model.) 3 Sheets—Sheet 3.
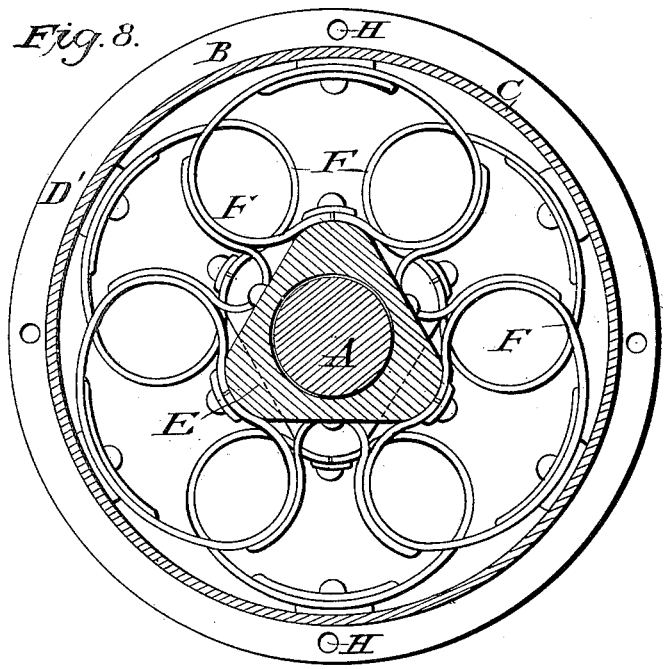
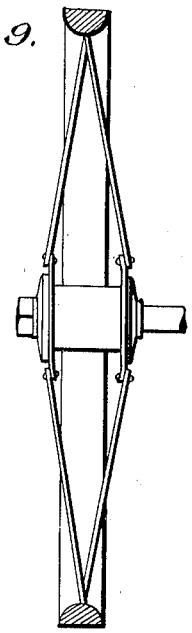
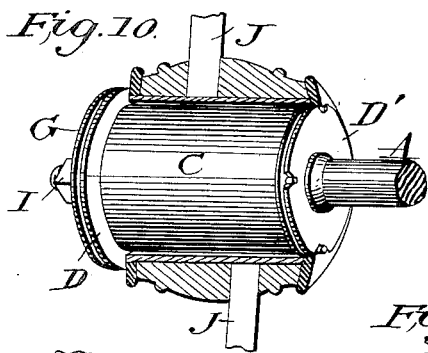
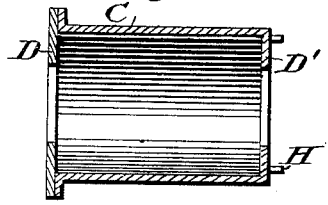
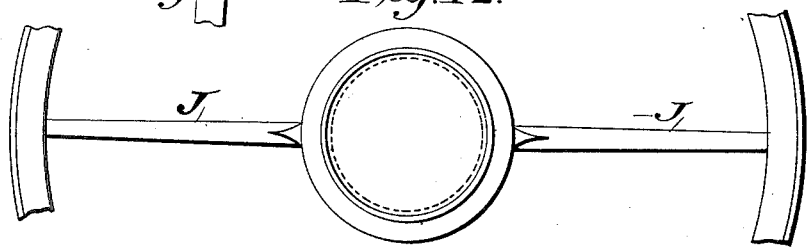
Witnesses:
Arthur Hayes.
Geo. A. Hayes.
Inventor:
Geo. Hayes.
THE NORRIS PETERS CO., PHOTO-LITHO., WASHINGTON, D. C.

UNITED STATES PATENT OFFICE.

GEORGE HAYES, OF MOUNT VERNON, NEW YORK.

RESILIENCY DEVICE FOR WHEELS.

SPECIFICATION forming part of Letters Patent No. 657,112, dated September 4, 1900.

Application filed January 17, 1900. Serial No. 1,810. (No model.)

*To all whom it may concern:*

Be it known that I, GEORGE HAYES, a citizen of the United States, and a resident of the city of Mount Vernon, county of Westchester, and State of New York, have invented new and useful Improvements in Resiliency Devices for Vehicles, of which the following is a specification.

My invention relates to a means whereby elasticity and resiliency are applied to the wheels and axles of a vehicle; and it consists in the construction of a certain device comprising a casing or boxing containing a system of certain springs, each formed of flat metal combined and located within the center or hub of the wheel to operate therewith and also to set upon the axle of the vehicle, the springs secured to the inner surface of the casing and also to a system of tubular base or axle blocks placed upon the axle.

It also consists of the same device formed as a component part of the wheel and also of the same device inserted within the wheel and upon the axle as a removable feature from both wheel and axle and also of the same device in combination with a ball-bearing construction placed around the axle, in which case the axle is rigid and the wheels revolve.

It further consists of the same device located upon and in combination with the axle of an automobile at any point desired between the wheels of the vehicle and not connected to or inserted into wheels, but connected with the body of the vehicle, and all such other constructive features and combinations of elements as are hereinafter more fully described, and pointed out in the claims, reference being had to the accompanying drawings, in which—

Figure 1 represents a cross-section of the device comprising casing, springs, and axle or base blocks upon which springs are based, also the axle. Fig. 2 is an edge view of a spring alone. Fig. 3 is an end view of one of the axle or base blocks. Fig. 4 is a longitudinal section of the device, including casing, springs, axle-blocks, covering-plates, &c., with axle (not in section) shown therein. All the above figures are approximately full size. Fig. 5 is a longitudinal section corresponding to that of Fig. 4, illustrating the construction of the device provided with ball-bearings. This view is about one-half full size. Fig. 6 is a longitudinal section of a cylinder or tube which fitting upon the axle and between the axle-blocks and axle carries the inner ball-bearings. Fig. 7 is a view of disk-plates illustrating the manner of keeping the device, springs, and their casing and outside securing-plates turning in unison when operated. Figs. 5, 6, and 7 are on a reduced scale. Fig. 8 is a cross-section of the device through axle, axle or base block, and casing, showing three springs in a set, with the addition of resisting-springs between each two main or supporting springs. It also shows how the springs may be reinforced by addition of leaves. This figure is on the same scale as Fig. 1. Fig. 9 is a section view of a tension-wheel as used for automobile-vehicles, but provided with my device serving as hub alone on reduced scale. Fig. 10 is a perspective view of the device introduced into and as the center of the hub of a wheel as formed for rigid spokes, the hub and spokes in section. Fig. 11 is a lengthwise section of casing alone, illustrating its construction as made in two parts only. Fig. 12 is a side view elevation of a hub-ring of a wheel with two spokes and portion of rim, the hub-ring having hollow center for reception of the device in completed condition. Fig. 13 is a rear elevation of a vehicle, (automobile,) showing two wheels, axle, position of motor connections with box or body, and upon the axle connected and supporting the body of the vehicle, braces or standards encircling two of the resilient devices, within which the axle revolves, the device remaining stationary, the casings united rigidly to the standards or braces.

On the drawings, A indicates the driving-axle of an automobile or similar vehicle upon which the motive power rests, the axle revolving with wheels at each end.

B indicates a disk-plate which may be an integral part of the axle A or secured thereupon, keyed fast, or otherwise confined rigidly thereto. It constitutes a backing against which my improved device is brought to bear.

My improvements relate to both front and rear axles and with or without ball-bearings, the latter being added when necessary whether rotating or not and to the wheels as a part thereof or inserted therein and also to axles where supporting the box or bottom of the vehicle-body as a substitute for the usual springs. As constructed for the rear axle and wheels it is formed as follows:

In Figs. 1, 2, 3, 4, 5, 6, 7, and 8, C indicates a cylindrical box or casing, of metal, inclosing springs. It may be formed a simple cylinder, as in Fig. 4 section, with end plates or disks applied or secured thereto, or, as in Fig. 11, with one end plate or disk integral therewith. Wherever an end plate is to be added, a projecting flange is formed thereto, as shown in Fig. 4 section.

D and D' indicate the end plates or disk terminations connected to the casing C. They are each formed with an aperture to encircle the axle and large enough to admit of a free play in all directions or angles without touching the axle as the springs are compressed.

E, E', and $E^2$ indicate tubular blocks in Fig. 4 (shown as three in number) keyed together, or they may be in one piece of metal, so formed as to constitute the same formation essentially as the three. The hollow center in the triple or single form is formed to fit closely upon the axle when to turn therewith and when thereupon is keyed rigidly thereto. At each end the axle-block in the one or three part form is pressed tight against the disk-plate B. The axle block or blocks have an exterior face ridged after the manner shown in Fig. 3.

F indicates springs formed of flat metal and shaped about as shown in Fig. 2, approximately semi-elliptical. The one face which is contiguous and secured to the inner surface of boxing C is convex thereto, while the face resting upon or against the axle-block E is indented or curved inwardly to fit over and be secure upon the convex ridge of the axle-block. The springs thus formed have two centers within and two centers outside the field, as indicated by their curve, the ends of each spring being upon the axle-block, abutting or overlapping, as desired. Within the boxing C, I arrange three sets of these springs alike in curvature, but the middle set preferably twice the width of the end sets thereof. Each set is arranged around to encircle the axle between axle-block and boxing and secured to both after the manner shown in Figs. 1 and 8. The springs F may be reinforced wherever desirable by the addition of plates or "leaves" after the usual manner of springs. In arranging the three sets of springs F within the casing or box C the middle set is so placed as to "break joint" with the end sets, as shown in Fig. 1, and the axle block or blocks must be formed or arranged to receive and hold them in that manner.

G indicates the outer end plate, which is sleeved upon the axle and pressed up tight against the axle-block. It may also be keyed thereto and to the axle when to turn therewith; but the casing or box C must not be pressed against by either the plate B or the plate G, as it must be allowed to move toward and from the axle at all angles as the springs are compressed.

To cause the casing C to revolve with the axle, an arrangement of pegs, lugs, or the like is constructed, as shown in Fig. 7 at H, which extend outwardly into a space H', is formed to the contiguous plate, (secured to the axle,) and in size and shape suitable to permit of the shifting of the casing C between plates B and G in the resiliency movement obtained by the use of the springs F.

A nut at I, threaded upon the end of the axle, serves to press and secure the plate G, axle-block E, or blocks and plate B rigidly in place upon the axle. In addition thereto they are keyed together and to the axle also. The apertured disk D may form a part of the casing C, as shown in Fig. 11, although if removable ready access may be had to the springs at that end. For convenience it is better to have them separable.

The spokes of the wheel may be connected direct to the casing C through outwardly-projecting flanges, if of wire "tensional." Also they may be, if of wood, by forming to the exterior face of the casing projections as sockets for their reception; but it is preferable to have the casing, with its springs, inclosed or set into a hub-ring, of wood or metal, with which the spokes are connected (being bolted thereto or keyed) after the manner shown in Figs. 10 and 12, in which J indicates the spokes so arranged. In that case the resiliency device may be readily removed from the wheel out of the hub-ring for repairs.

Another modification in construction of casing is shown in Fig. 5, the shell being composed of three parts C, C', and $C^2$, the two end parts being formed cylindrical, each with an apertured end disk as an integral portion, and also constructed and arranged to fit upon and be keyed, riveted, or otherwise secured to the central portion, each having a set of springs attached to its interior surface. This renders them separable, facilitating access to the springs when desired.

End disks of the box and the contiguous disk-plates to fit direct upon the axle are shown alone in Fig. 7, illustrating means whereby they are compelled to revolve in unison. A cut in one at H' and a peg extending outwardly from the other at H within the space formed by the cut, they being so arranged that the peg will rest usually against one edge of the opening, which is formed of suitable size to permit of the resilient movement of the end of the casing C or plate forming part of or connected to the casing C. There may be any desired number of similar cuts and pegs, or projections may be made to both plates, as shown in Fig. 1 at $H^2$, to operate in the same manner.

In Fig. 5 section ball-bearings are added to adapt the device to operate in the front wheel or wherever the axle is fixed (not revolving) and the wheel to revolve thereon.

A cylinder, as in Fig. 6, is formed in two parts joined by inserting each end part into the hollow of the axle block or blocks with balls in place and then inserting the other end part until they meet and overlap, as at M, the ends of the axle-block being formed so as to cover and revolve upon the balls, as at N and N', the outside nut I securing all together.

Other methods of arranging ball-bearings may be substituted; but as shown the arrangement and construction are simple and effective.

To use the device upon the rear axle in support of the vehicle box or body, the ball-bearing form of Fig. 5 is used with any desired number of springs, one set or more, as desired, with any desired number in a set, with the device placed upon the axle and the cylinder C encircled or otherwise connected with and rigidly secured to braces P, which reach upward and are attached to the vehicle box or body. In this case the axle revolves within the device and the latter is stationary and rigidly secured against turning, so that the device may be applied in three ways—with wheel to axle, all revolving, with wheel to fixed axle, the device revolving upon the axle, and to a revolving axle, while the device is non-revolving.

What I claim is—

1. The herein-described sectional box, or casing, containing series of metal springs secured to the casing, and also to a sectional axle-block formed with ridged and grooved exterior surface and hollow center, the springs each of one piece of metal, semi-elliptical with the face of each next the axle-block indented to fit the curve of the ridge, constituting the face portion of the axle-block to which it is attached, essentially as set forth.

2. The ridged and grooved axle-block formed of three sections united, the ridges and grooves longitudinal, and those of the middle section of the axle-block breaking joint with the two end sections, essentially as set forth.

3. The metal shell herein described, composed of three cylindrical parts fitted together, to each of which is interiorly attached springs also secured to the exterior of a tubular center-block, or axle-block, adapted to fit upon the axle of a vehicle, essentially as set forth.

4. The combination of the elastic and resilient device herein described with the ball-bearing device fitting upon a revolving axle, the axle passing through the ball-bearings, and the elastic and resilient device connected with the body of the vehicle by rigid braces, all constructed and arranged essentially as set forth.

5. A casing of three parts fitted together, a grooved and ridged sectional axle-block, three sets of springs arranged around the axle-block and within the casing, and between every two springs of each set a reinforcement-spring; all constructed, arranged and combined in manner and for the purpose set forth.

GEO. HAYES.

Witnesses:
ARTHUR HAYES,
HARRY I. BLACK.